Sept. 9, 1958 J. R. FERGUSON 2,851,627
HEADLIGHT UNIT FOR MOTOR VEHICLES
Original Filed July 14, 1952
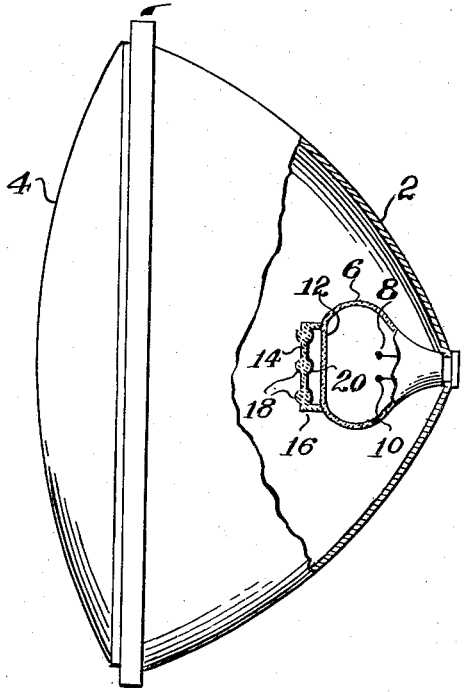
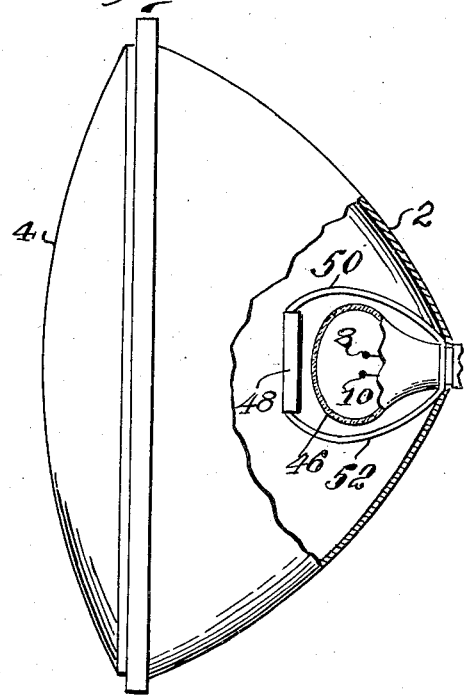
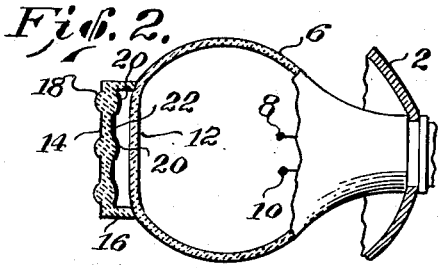
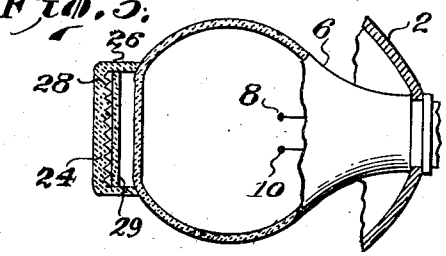
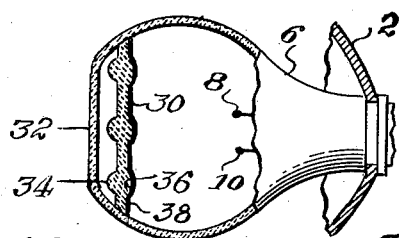
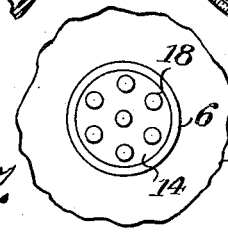
INVENTOR.
James R. Ferguson.
BY
Mason & Mason
Attorneys.

United States Patent Office 2,851,627
Patented Sept. 9, 1958

2,851,627

HEADLIGHT UNIT FOR MOTOR VEHICLES

James R. Ferguson, Bristol, Va., assignor of one-half to Bristol Steel & Iron Works, Inc., Bristol, Va.-Tenn., a corporation of Virginia Original application July 14, 1952, Serial No. 298,706, now Patent No. 2,744,209, dated May 1, 1956. Divided and this application February 16, 1956, Serial No. 565,914

8 Claims. (Cl. 313—114)

This invention relates to a headlight unit for automotive vehicles of the general type illustrated in the patents to Robert O. Ferguson, Numbers 2,512,623 and 2,565,763, issued June 27, 1950, and August 25, 1951, respectively; and in application Serial Number 298,706, filed July 14, 1952, now Patent Number 2,744,209, granted May 1, 1956, of which this application is a division.

The principal object of this invention is to provide a headlight unit having a reflector for reflecting back the light beams of oncoming vehicles, which reflector is housed within the hermetically sealed space forming the interior of a sealed beam headlight unit. Assuming that either or both of the headlights of a car equipped with the device of this invention have been extinguished, or that one of the filaments of one or both of the lights has burned out, the beams of light from an approaching vehicle will be partially reflected back to the driver of such approaching vehicle. By this means the exact location of the car can be readily determined even when approaching at considerable speed and the danger of a collision greatly lessened. Since the reflecting material does not let light rays from the filaments pass directly to the lens, they will be reflected to and then from the sides of the casing and be diffused. Such diffused light is, according to the inventor who has done much work along this line, much more effective in penetrating fog than the direct rays from the filaments.

Another object is to combine a reflector for oncoming headlight beams with a fog protector, and associate these parts with the light source means, either by making them an integral part of the light source means, or by mounting these elements with the hermetically sealed interior of the unit in close association with the light source means.

A further object is to so locate a reflector of the type as set forth herein, in proper position with regard to the fog protector, the light source means and headlight lens, in order that none of these parts will interfere with the proper function of one or more of the other parts, yet each will operate at maximum efficiency.

Other objects will appear hereinafter throughout the specification.

In the drawing:

Figure 1 is a side elevation of one form of the headlight unit with a part of the casing broken away and parts shown in section.

Figure 2 is an enlarged detail view of the combined reflector and fog protector shown in Figure 1.

Figures 3, 4 and 5 are views similar to Figure 2 showing different forms of the combined reflector and fog protector.

Figure 6 is a view similar to Figure 1 showing still another form of the invention; and Figure 7 is a front view in elevation of the bulb and cap structure of Figures 1 and 2.

Referring to the form of the invention shown in Figures 1 and 2, the numeral 2 represents the back wall of the headlight casing and 4 the front wall or lens. A bulb or envelope 6 centrally mounted in the back wall of the casing projects into the casing and carries the usual light filaments 8 and 10. The front end of the bulb 6 is flattened as shown at 12, and mounted over and spaced from this flattened portion is a glass cap or plate 14 which is connected by a circular wall 16 of the same material as the plate and fused to the front portion of the bulb. Each side of the glass cap or plate has a plurality of buttons projecting outwardly therefrom, the forwardly facing buttons being represented at 18 and the rearwardly facing buttons at 20. The rear face of the glass cap or plate including the buttons is covered by a coating or surface 22 of reflecting material composed of chromium, nickel, aluminum or other reflecting materials or alloys thereof and forms a secondary reflector. This coating may be applied by spraying, painting or other methods. The coating may also be composed of foil. This invention is not concerned with the particular material used as the secondary reflector providing it has the necessary ability to withstand the heat and pressure necessary to the manufacture of the bulb. While the coating described above has been designated as the secondary reflector, it will be understood that the inner surface of the back wall of the casing constitutes the primary reflector. The secondary reflector because of its position with regard to the light source or filaments will function as a fog protector. If desired the front face, or both faces of the secondary reflector, may be polished to provide better reflecting surfaces.

As to the form of Figure 3, the back wall of the headlight casing, the bulb or envelope and the filaments bear the same reference characters as the form of Figures 1 and 2. In this figure, the front portion of the glass bulb is flattened as in Figures 1 and 2 and has a combined secondary reflector and fog protector cap or plate 24 spaced from the flattened portion of the bulb and secured thereto by a circular wall 26 attached to the front portion of the bulb. The cap has a reflector 28 of prismatic pyramidal design presenting a reflecting surface and a backing member 29. The cap of this figure is composed of plastic material such as synthetic or resinous material or it may be made of glass. Either material may be applied to the conventional bulb by fusing after or during manufacture.

The constructions shown in Figures 4 and 5 correspond to those of Figures 2 and 3, except that the caps are located within the bulb or envelope. As in Figure 3, the back wall of the casing, the bulb and the filaments have been given the same reference character as Figures 1 and 2.

In Figure 4, a bridge member 30 extends across the front or forwardly facing flattened portion 32 and is spaced therefrom. Each side of the bridge member is provided with a plurality of buttons projecting outwardly therefrom as in the form of Figures 1 and 2. The buttons on the front side of the plate are shown at 34 and those on the rear side at 36. As in Figures 1 and 2, the rear side of the bridge member has a reflector and fog protector 38. Only the forward face of the reflector and fog protector may have a reflecting surface, but both sides may have such surfaces, if desired.

In Figure 5, the bulb or envelope 6 has a forwardly facing portion 40 similar to the forms of Figures 1, 2, 3 and 4, and a bridge member 42 which has a multi-prismatic pyramidal inner portion 44 which also forms the fog protector.

Preferably both the bulbs and the bridge members of Figures 4 and 5 are made of glass but it will be understood that any other suitable material could be used.

In the form shown in Figure 6, the bulb or envelope 46 is not flattened as in the other forms and the combined reflector and fog protector 48 is supported in front of the bulb by two supporting arms 50 and 52, although any suitable number of arms may be used, or a supporting cylinder, not shown, could be substituted for the arms. The reflector and fog protector of this form may have, either the forward, or both the forward and rearward faces provided with reflecting surfaces. Further, it will be understood that the reflector and fog protector may be made of glass or plastic materials composed of synthetic resins.

In Figure 7 is shown the symmetrical arrangement of the buttons on the forward face of the cap or plate 14 shown in Figures 1 and 2. The arrangement of the buttons on the rearward face of the plate 14 is the same as that on the forward face and each button on one side of the plate is in substantially horizontal alignment with a button on the other side of the plate. As clearly shown in Figures 1, 2 and 4, the buttons are all convex in shape and the radius of curvature of the buttons on the rearward face of the plate is preferably greater than that of the buttons on the forward face.

While the means which connects the plate 14 to the bulb or envelope 6 in Figures 1 and 2 has been described as being a circular wall, it will be understood that connecting means in the form of legs fused to the bulb may be used, if desired.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A headlight unit comprising a headlight casing having a front wall, a back wall, and a sealed interior space; the inner surface of said back wall constituting a primary reflecting surface, a lens forming the front wall of said casing, a transparent hollow bulb supported by said back wall and extending into said space and toward said lens, the front face of said bulb being spaced from said lens, a source of light within said bulb, and a secondary reflector and fog protector means supported in said casing and located between said source of light and said lens, said means being mounted in spaced relation to the front face of said bulb.

2. A headlight unit consisting of a headlight casing with an inside forwardly facing primary reflecting surface, a source of light comprising filament means located within said casing, said casing having a sealed interior space, a lens forming the forwardly facing wall of said casing, a secondary forwardly facing reflector and fog protector means located between said source of light and said lens and within said sealed casing, said secondary reflector and fog protector means including a glass envelope surrounding said filament means, and a cap having means mounting the same on the exterior surface of said glass envelope forming part of said fog protector means, said cap being spaced from said envelope.

3. A headlight unit consisting of a headlight casing with an inside forwardly facing primary reflecting surface, a source of light comprising filament means located within said casing, said casing having a sealed interior space, a lens forming the forwardly facing wall of said casing, a secondary forwardly facing reflector and fog protector means located between said source of light and said lens and within said sealed casing, said secondary reflector and fog protector means including a glass envelope surrounding said filament means, and a cap having means mounting the same on the exterior surface of said glass envelope forming part of said fog protector means, said cap being spaced from said envelope and having a plurality of forwardly facing and rearwardly facing buttons, and a reflecting layer covering certain of said buttons.

4. A headlight unit consisting of a headlight casing with an inside forwardly facing primary reflecting surface, a source of light comprising filament means located within said casing, said casing having a sealed interior space, a lens forming the forwardly facing wall of said casing, a secondary forwardly facing reflector and fog protector means located between said source of light and said lens and within said sealed casing, said secondary reflector and fog protector means including a glass envelope surrounding said filament means, and a cap having means mounting the same on the exterior surface of said glass envelope forming part of said fog protector means, said cap being spaced from said envelope and having a plurality of forwardly facing buttons, and a reflecting layer covering at least some of said rearwardly facing buttons.

5. A headlight unit consisting of a headlight casing with an inside forwardly facing primary reflecting surface, a source of light comprising filament means located within said casing, said casing having a sealed interior space, a lens forming the forwardly facing wall of said casing, a secondary forwardly facing reflector and fog protector means located between said source of light and said lens and within said sealed casing, said secondary reflector and fog protector means including a glass envelope surrounding said filament means, and a cap having means mounting the same on the exterior surface of said glass envelope forming part of said fog protector means, said cap having a multi-prismatic reflecting and fog protecting portion.

6. A headlight unit consisting of a headlight casing with an inside forwardly facing primary reflecting surface, a source of light comprising filament means located within said casing, said casing having a sealed interior space, a lens forming the forwardly facing wall of said casing, a secondary forwardly facing reflector and fog protector means located between said source of light and said lens and within said sealed casing, said secondary reflector and fog protector means including a glass envelope surrounding said filament means, and a bridge extending across the interior of said glass envelope, forming part of said fog protector means.

7. A headlight unit consisting of a headlight casing, with an inside forwardly facing primary reflecting surface, a source of light comprising filament means located within said casing, said casing having a sealed interior space, a lens forming the forwardly facing wall of said casing, a secondary forwardly facing reflector and fog protector means located between said source of light and said lens and within said sealed casing, said secondary reflector and fog protector means including a glass envelope surrounding said filament means, and a bridge extending across the interior of said glass envelope, forming part of said fog protector means, said bridge having forwardly and rearwardly facing buttons and a reflecting layer covering at least some of said buttons.

8. A headlight unit consisting of a headlight casing with an inside forwardly facing primary reflecting surface, a source of light comprising filament means located within said casing, said casing having a sealed interior space, a lens forming the forwardly facing wall of said casing, a secondary forwardly facing reflector and fog protector means located between said source of light and said lens and within said sealed casing, said secondary reflector and fog protector means including a glass envelope surrounding said filament means, and a bridge extending across the interior of said glass envelope, forming part of said fog protector means, said bridge having a multi-prismatic reflecting and fog protecting portion forming part of said fog protector means.

References Cited in the file of this patent

UNITED STATES PATENTS

| | | |
|---|---|---|
| 2,226,879 | Stam | Dec. 31, 1940 |
| 2,744,209 | Ferguson | May 1, 1956 |
| 2,744,210 | Ferguson | May 1, 1956 |